March 10, 1970 C. L. RUTHROFF 3,500,207

AUTOMATIC ROTATION CORRECTION FOR CROSS-POLARIZED MICROWAVE RECEPTION

Filed Sept. 22, 1967 2 Sheets-Sheet 1

INVENTOR
C. L. RUTHROFF
BY [signature]
ATTORNEY

March 10, 1970 C. L. RUTHROFF 3,500,207
AUTOMATIC ROTATION CORRECTION FOR CROSS-POLARIZED MICROWAVE RECEPTION
Filed Sept. 22, 1967 2 Sheets-Sheet 2

United States Patent Office 3,500,207
Patented Mar. 10, 1970

3,500,207

AUTOMATIC ROTATION CORRECTION FOR CROSS-POLARIZED MICROWAVE RECEPTION

Clyde L. Ruthroff, Holmdel, N.J., assignor to Bell Telephone Laboratories, Incorporated, Murray Hill, Berkeley Heights, N.J., a corporation of New York
Filed Sept. 22, 1967, Ser. No. 669,795
Int. Cl. H04b *1/62, 7/10;* H04i *1/08*
U.S. Cl. 325—60 8 Claims

ABSTRACT OF THE DISCLOSURE

Apparatus for correcting polarization alignment with the receiving station in a microwave system in which intelligence signals are transmitted in two cross-polarizations. A pilot signal transmitted in one of the cross-polarizations is detected as an error signal in the other polarization at the receiving station and fed back to a polarization rotator which rotates the entire received signal to minimize the error. Continuous alignment of the received signal with the polarization selective components of the receiving station is maintained.

BACKGROUND OF THE INVENTION

This invention relates to microwave transmission systems and, more particularly, to correcting polarization alignment in a microwave system in which two cross-polarizations are used.

As the usage of electromagnetic transmission increases, the limited availability of channels becomes a cause of great concern. One means of increasing capacity is to utilize multiple polarizations for a given frequency. If the polarization discrimination in a radio system is sufficiently good, the same frequency can be used in each of two orthogonal polarizations and the communicating capacity can be doubled. Even if the antenna has no inherent cross-polarization coupling, movement of the antenna will cause coupling between the polarizations. The function of the present invention is to minimize cross-polarization coupling caused by time variable factors such as antenna sway. Conventionally, the solution to the problem has been an elimination of antenna sway by construction of physically rigid towers. This invention offers as an alternative the correction of the rotation after the signal reaches the receiving station.

SUMMARY OF THE INVENTION

Discrimination between two polarizations is necessary for simultaneous transmission of intelligence in dual polarizations. In a microwave transmission system movement of an antenna will cause rotation of the transmitted wave and misalignment of the wave with the polarization selective components of the receiving station such that the discrimination between the polarizations will be lost.

The present invention provides for correction of this rotation by passing the received wave through a feedback controlled polarization rotator. The transmitted wave is supplied with a pilot in a first polarization to be used to index said first polarization. A reference polarization and an orthogonal distinct polarization are established in the receiving station. The components of the pilot signal received in said two receiving station polarizations are compared in a balanced detector to produce an error signal which indicates both the direction and magnitude of the misalignment. The error signal is used in a feedback loop to control the polarization rotator which aligns the received wave with the receiving station polarization.

When the pilot is received solely in the reference polarization this reference polarization is in one-to-one correspondence with the transmitted first polarization. By continuous feedback of the error signal the rotational alignment of the wave is maintained.

Thus, it is an object of the invention to provide a means for correcting for unwanted rotation in a dual polarized wave.

It is a feature of the invention to supply a pilot signal on one of the transmitting polarizations to act as an index mark of said polarization.

It is an additional feature to provide means for detecting the pilot on the received wave and deriving from it a control signal indicating the direction and magnitude of the undesired rotation.

DESCRIPTION OF THE DRAWINGS

The novel features of the invention will become apparent from the following detailed descriptions of preferred embodiments of the invention taken in conjunction with the accompanying drawings in which.

DETAILED DESCRIPTION

Figure 1:
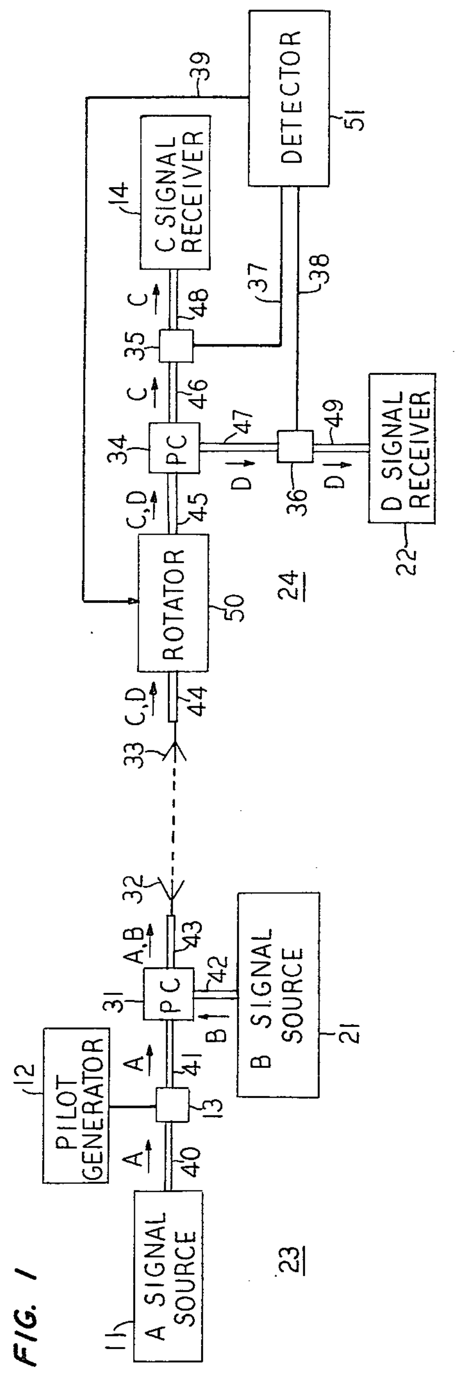
FIG. 1 is a block diagram of an embodiment of the invention.

Referring to FIG. 1, there is shown, by way of example, an embodiment of the invention illustrating a point-to-point transmission system transmitting in two polarizations, indicated by arrows labeled A and B, and receiving in polarization orientations indicated by arrows labeled C and D.

Intelligence signals are produced by a signal source 11 in a first polarization A and applied to waveguide 41 through waveguide 40. A pilot signal is generated in a pilot generator 12 and coupled by coupler 13 in said first polarization A into waveguide 41. Other intelligence signals are produced by B signal source 21 in a second polarization B and applied to waveguide 42. The waves in guides 41 and 42 are combined by polarization coupler 31 into a single cross-polarized output wave in waveguide 43 and the output wave is transmitted from transmitting station 23 by antenna 32.

The output wave is received by antenna 33 at receiving station 24 which has polarization selective components designed to receive in two cross polarizations designated reference polarization C and distinct polarization D. The rotary orientation of the polarization selective components is arbitrarily fixed. The received wave is propagated in waveguide 44 to a controllable polarization rotator 50. The rotated wave appears in waveguide 45. The component of the rotated wave in said reference polarization C is coupled out of the rotated wave by polarization coupler 34 and propagated in waveguide 46. The resulting portion of the rotated wave, which is the component in said distinct polarization D, is propagated in waveguide 47. Couplers 35 and 36 remove the components of pilot signal present, respectively, in reference polarization C and the distinct polarization D. The pilot signals on the reference polarization C and the distinct polarization D are connected to detector 51 by conductors 37 and 38, respectively. Waveguide 48 propagates the component in the reference polarization C without the pilot signal to C signal receiver 14. Likewise, waveguide 49 propagates the component in the distinct polarization D without the pilot signal to D signal receiver 22.

The voltage signals on conductors 37 and 38 are compared in detector 51 which produces, in a manner which will be more fully discussed below in regard to FIG. 2, an output voltage on conductor 39 proportional to the magnitude of the rotation of the input wave relative to the reference polarization and possessing a sign indicating the direction of said rotation. The output voltage is applied as a control to rotator 50 in a manner well known by those skilled in the art to cause rotation of the input wave in waveguide 44 so as to minimize said output voltage.

Thus, when the output voltage on conductor 39 is reduced to zero, the signal received by C signal receiver 14 on the reference polarization C will be exclusively that signal produced by signal source 11 in polarization A, and the signal received by D signal receiver 22 in the distinct polarization D will be exclusively that signal produced by signal source 21 in polarization B. Automatic correction by the feedback mechanism thus provides continuous discrimination between the cross-polarizations.

Figure 2:
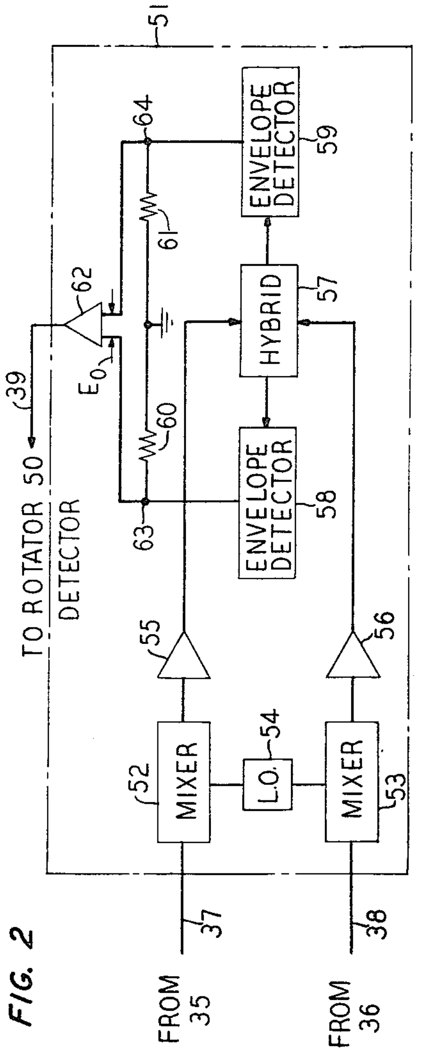
FIG. 2 is a block diagram illustrating the details of the detector shown in FIGS. 1 and 3.

Referring to FIG. 2 in conjunction with FIG. 1, assume that the output wave is radiated in cross-polarizations A and B and the receiving station 24 is established with cross-polarizations C and D where C corresponds to polarization A and polarization D corresponds to polarization B. Assume further that the pilot signal produced by generator 12 is in polarization A and is a sinusoidal voltage signal whose amplitude is $E_1$, and that the input wave is received at a positive angle $\alpha$ with the receiving station orientation. The pilot signal is therefore received rotated by an angle $\alpha$ from the reference polarization C, and the amplitude of the component of the pilot received in polarization C is therefore $E_1 \cos \alpha$. Since the reference polarization C and the distinct polarization D are orthogonal, the amplitude of the pilot signal received in polarization D is $E_1 \sin \alpha$. These voltage signals in the reference and distinct polarizations appear on conductors 37 and 38, respectively, as was described in reference to FIG. 1 hereinbefore.

The signals are converted to IF by mixers 52 and 53, respectively. Both mixers 52 and 53 share a common local oscillator 54 thus preserving the relative phase between the components in the two polarizations. The outputs of mixers 52 and 53 are amplified by identical amplifiers 55 and 56, respectively, and fed into a hybrid 57 which couples the inputs and produces two outputs; the first output is the sum of the inputs to the hybrid and the second is the difference of the inputs to the hybrid.

As an example of a suitable hybrid, a magic-T can be used which would produce outputs for the sum and difference with amplitudes of $E_2(\cos \alpha + \sin \alpha)$ and $$E_2(\cos \alpha - \sin \alpha)$$

respectively, where $E_2$ is $E_1$ times the gain of amplifier 55 or 56.

Envelope detector 58 determines the envelope of the sum, and envelope detector 59 likewise determines the envelope of the difference. The absolute value of the sum thus produced at point 63 is subtracted from the absolute value of the difference thus produced at point 64 by resistors 60 and 61 connected as shown. The resultant is represented by $E_0 = 2E_2 \sin \alpha$. $E_0$ is amplified by a DC amplifier 62 and applied as a control voltage to the polarization rotator 50 in a manner well known to one skilled in the art causing the input wave to be rotated so as to minimize the voltage $E_0$. $E_0$ is proportional to the angle $\alpha$ between the input wave orientation and the receiving station orientation, and since $\alpha$ was assumed positive, the control voltage $E_0$ is positive; if the rotation were in the opposite direction, $\alpha$ would be negative and thus $E_0$ would be negative and rotator 50 would rotate the input wave in the opposite direction.

A one-way transmission system is shown in FIG. 1, but it is to be expressly understood that the invention is in no way limited to one-way transmission. The embodiment shown in FIG. 1 could readily be modified to two-way operation by one skilled in the art.

Figure 3:
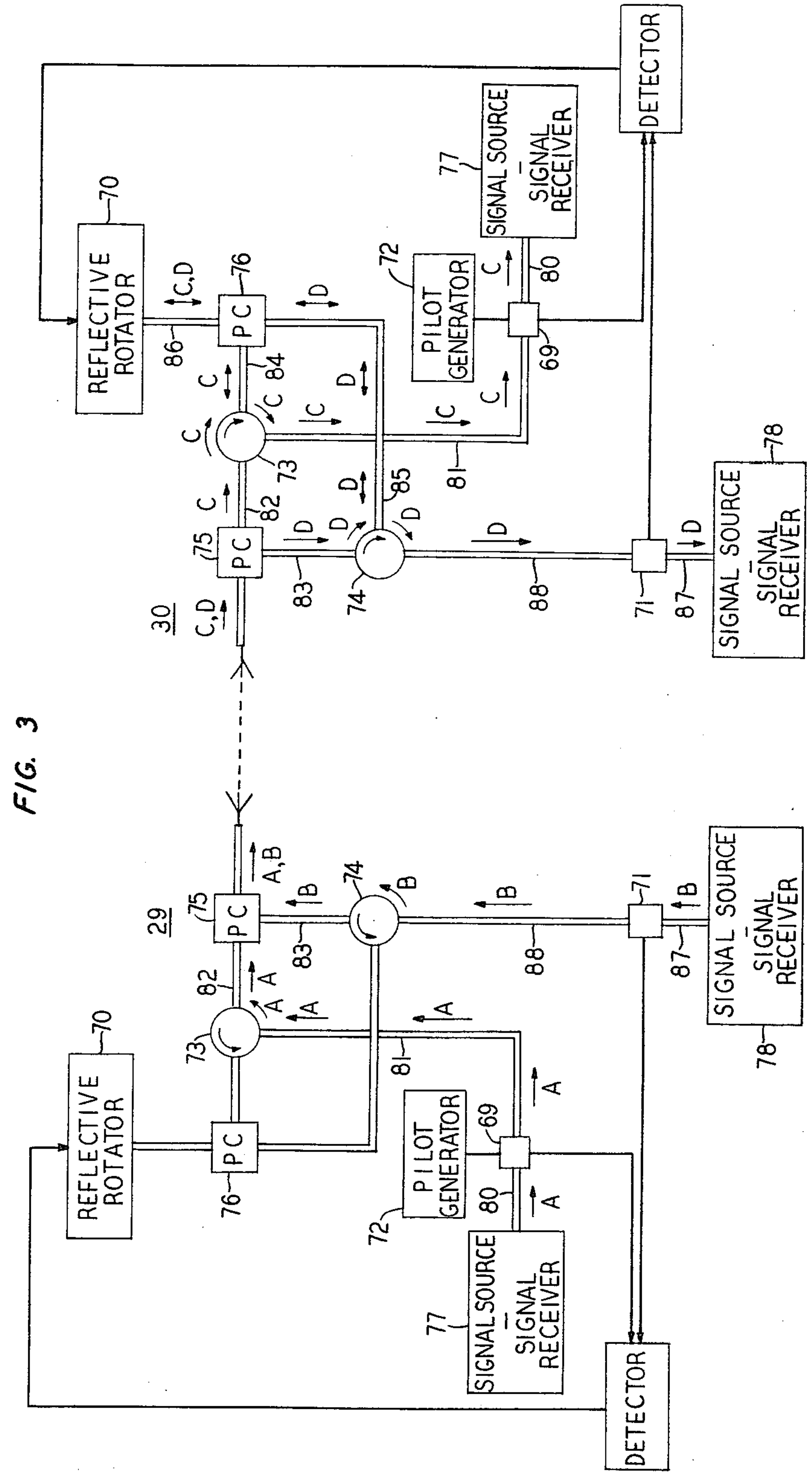
FIG. 3 is a block diagram of a modified embodiment of the invention.

Referring to FIG. 3, there is shown, by way of example, a modified embodiment of the invention illustrating a two-way transmission system between communicating stations 29 and 30. Stations 29 and 30 are identical and corresponding elements are indicated by identical numbers at both stations. Stations 29 and 30 both include signal source-signal receiver pairs 77 and signal source-signal receiver pairs 78. As is well known in the art, signal source-signal receiver pairs can be designed to apply or receive signals from a two-way transmission path. Signal source-signal receiver pairs 77 apply or receive signals from waveguides 80 and signal source-signal receiver pairs 78 apply or receive signals from waveguides 87. Reflective rotators 70 are within the receiving paths as is indicated by the arrows labeled C and D but not within the transmitting paths as is indicated by the arrows labeled A and B. Rotators 70 are reflective polarization rotators; for example, Faraday rotators short circuited at the output end.

Assume transmission from communication station 29 to communication station 30, but since stations 29 and 30 are identical, transmission from station 30 to station 29 is accordingly identical. Signals applied to waveguide 80 by signal source-signal receiver pair 77 in a first polarization A and the pilot signal generated by pilot generator 72 are combined by pilot coupler 69 and propagated in waveguide 81 to circulator 73 where the wave in the first polarization A is coupled into waveguide 82 exclusively. Likewise, in second polarization B the wave applied to waveguide 87 by signal source-signal receiver pair 78 passes through pilot coupler 71 into waveguide 88 and is coupled by circulator 74 exclusively into waveguide 83. The two polarizations are combined by polarization coupler 75. As is described hereinbefore in regard to FIG. 1, the output wave is received at communication point 30 with a rotation angle $\alpha$. The principle of polarization correction is the same as that described previously; the essential difference is that the input wave does not pass directly through the rotator 70, and hence, a two-way feedback system is stable. The input wave is split into two components by polarization coupler 75 such that the components in said reference polarization C are propagated in waveguide 82 and the components in said distinct polarization D are propagated in waveguide 83. These components of the received wave are coupled exclusively to waveguides 84 and 85, respectively, by circulators 73 and 74, respectively. The two polarization are joined by polarization coupler 76 and fed into waveguide 86, then into controllable reflective rotator 70 which rotates the combined wave. The rotated wave is returned in waveguide 86. Polarization coupler 76 splits said wave into its reference and distinct polarization components which are propagated respectively in waveguides 84 and 85 to circulators 73 and 74. Circulators 73 and 74 couple the components of the rotated waves exclusively into waveguides 81 and 88, respectively. The paths to the corresponding signal source-signal receiver pairs 77 and 78, the pilot detection by pilot couplers 69 and 71, respectively, and the feedback mechanism are identical to those hereinbefore described in regard to FIG. 1 and no further discussion is necessary here.

While the principles of the invention have been described in connection with specific embodiments, it is to be clearly understood that this description is made only by way of example and not as a limitation upon the scope of the invention as set forth in the accompanying claims.

What is claimed is:

1. A multiple polarization transmission system with apparatus for aligning a received multply polarized wave with a receiver comprising in combination:

means for transmitting a multiply polarized wave;

means for transmitting a pilot signal in one of the polarizations of said wave; and means for receiving said wave and said pilot including means for forming an error signal in response to the rotary angle between the polarization orientations of said pilot signal and said receiving means, means for rotating said received wave and said pilot signal, and means for applying said error signal to said rotating means to control rotation of said received wave whereby said wave is aligned with the orientation of said receiving means.

2. Apparatus for receiving electromagnetic radiation which includes a multiply polarized wave and a pilot signal in one polarization of said wave and for maintaining polarization alignment of said wave with a fixed orientation of said receiving apparatus including means for forming an error signal in response to the rotary angle between the polarization orientation of said pilot signal and said fixed orientation of said receiving apparatus, means for rotating said received wave and said pilot signal, and means for applying said error signal to said rotating means to control rotation of said received wave whereby said wave is aligned with the fixed orientation of said receiving apparatus.

3. A multiple polarization transmission system with apparatus for correcting for rotation of a multiply polarized wave comprising in combination:
- means for applying to a transmission path a multiply polarized wave having a predetermined relationship among polarizations thereof;
- means for applying a pilot signal to said path in one of said polarizations;
- means connected to said path for transmitting said multiply polarized wave and said pilot signal;
- means for receiving said transmitted multiply polarized wave and said transmitted pilot signal;
- means connected to said receiving means for rotating said received multiply polarized wave and said received pilot signal;
- means for detecting said rotated multiply polarized wave and said rotated pilot signal, said detecting means including polarization selective components adapted to receive a multiply polarized wave having the same predetermined relationship among polarizations thereof as said transmitted multiply polarized wave, said polarization selective components having an arbitrarily fixed rotary orientation;
- means for removing said pilot signal from said multiply polarized wave; and
- a feedback mechanism using said removed pilot signal to control said rotating means so as to produce alignment of said received multiply polarized wave with said fixed rotary orientation.

4. A cross-polarization transmission system with apparatus for correcting for rotation of a cross-polarized wave comprising in combination:
- means for applying to a transmission path a cross-polarized wave;
- means for applying a pilot signal to said path in one of said cross-polarizations;
- means connected to said path for transmitting said cross-polarized wave and said pilot signal;
- means for receiving said cross-polarized wave and said pilot signal;
- means connected to said receiving means for rotating said received cross-polarized wave and said pilot signal;
- means for detecting said rotated cross-polarized wave, said detecting means including polarization selective elements adapted to receive a cross-polarized wave, said polarization selective elements having an arbitrarily fixed rotary orientation;
- means for removing said pilot signal from said rotated cross-polarized wave; and
- a feedback mechanism using said removed pilot signal to control said rotation means so as to produce continuous alignment of said received cross-polarized wave with said fixed rotary orientation.

5. A system as in claim 4 wherein said feedback mechanism includes means for comparing the components of said pilot signal received in both of said cross-polarizations and forming an error signal therefrom.

6. A system as in claim 5 wherein said comparing means includes means for coupling said components of said pilot signal such that a first signal proportional to the sum of the components and a second signal proportional to the difference of said components is produced, and means for subtracting said second signal from said first signal to produce a resultant signal proportional to the magnitude of the difference between the rotary orientation of said received wave and said arbitrarily fixed rotary orientation and possessing a sign corresponding to the direction of said rotary difference.

7. A cross-polarization transmission system comprising in combination:
- means for transmitting intelligence signals in a first and second polarization;
- means for transmitting a pilot signal in said first polarization exclusively;
- a transmitting antenna which radiates a cross polarized wave containing said intelligence signals and said pilot signals;
- a receiving antenna which recives said cross-polarized wave and said pilot signals;
- means for rotating said cross-polarized wave and said pilot signal;
- means for dividing said received wave into cross-polarized components, said components being in an arbitararily fixed reference polarization and a distinct orthogonal polarization;
- means for detecting said pilot signal in each of said reference and distinct polarizations;
- means for comparing the components of said pilot signal received in said reference and said distinct polarizations and forming an error signal therefrom;
- means for controlling said polarization rotation by said error signal so as to cause said rotation such that said error signal is minimized whereby said intelligence signals in said first polarization are received exclusively in said reference polarization and said intelligence signals in said second polarization are received exclusively in said distinct polarization.

8. A system as in claim 7 wherein said rotating means is a ferrite polarization rotator and said controlling means is a negative feedback loop including:
- means for coupling said components such that a first signal proportional to the sum and a second signal proportional to the difference is produced;
- means for subtracting said second signal from said first signal to produce a resultant signal proportional to the magnitude of the difference between the rotary orientations of said first polarization and said reference polarization and possessing a sign corresponding to the direction of said rotation; and
- means for activating said rotation means with said resultant signal.

References Cited

UNITED STATES PATENTS 3,214,590 10/1965 Schactman ---------- 250—199

ROBERT L. GRIFFIN, Primary Examiner

ALBERT J. MAYER, Assistant Examiner

U.S. Cl. X.R.

179—15; 325—60, 65, 306, 472, 473